United States Patent
Tylicki et al.

(10) Patent No.: US 8,682,252 B2
(45) Date of Patent: *Mar. 25, 2014

(54) SYSTEM AND METHOD FOR TRANSMITTING SIGNALS TO AN APPLIANCE

(71) Applicant: HeathCo, LLC, Bowling Green, KY (US)

(72) Inventors: Scott Blaise Tylicki, Bowling Green, KY (US); Jimmy David Claiborne, Scottsville, KY (US); Timothy Gale Birdwell, Lafayette, TN (US)

(73) Assignee: HeathCo, LLC, Bowling Green, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/672,210

(22) Filed: Nov. 8, 2012

(65) Prior Publication Data

US 2013/0072267 A1    Mar. 21, 2013

Related U.S. Application Data

(63) Continuation of application No. 12/473,972, filed on May 28, 2009, now abandoned, which is a continuation of application No. 12/132,343, filed on Jun. 3, 2008, now abandoned.

(51) Int. Cl.
*H04B 7/00* (2006.01)
*H04K 3/00* (2006.01)

(52) U.S. Cl.
USPC .......................... 455/66.1; 455/128

(58) Field of Classification Search
USPC ........ 455/66.1, 128; 70/1, 432, 448; 340/328, 340/330, 392.1–393.1
See application file for complete search history.

(56) References Cited

U.S. PATENT DOCUMENTS

| | | |
|---|---|---|
| 5,564,294 A | 10/1996 | Chen |
| 5,881,864 A | 3/1999 | Shelhorse |
| 8,055,200 B2 | 11/2011 | Tylicki et al. |
| 2004/0085205 A1 | 5/2004 | Yeh |
| 2007/0191075 A1 | 8/2007 | Greene et al. |
| 2009/0298449 A1 | 12/2009 | Tylicki et al. |
| 2009/0298450 A1 | 12/2009 | Tylicki et al. |

OTHER PUBLICATIONS

Amendment A filed Jul. 15, 2011, in related U.S. Appl. No. 12/132,295, Filed Jun. 3, 2008, entitled System and Method for Transmitting Signals to an Appliance, Inventors: Tylicki et al., 19 pages.

Amendment under 37 CFR 1.312 and Reply to Notice of Allowance filed Sep. 22, 2011, in related U.S. Appl. No. 12/132,295, filed Jun. 3, 2008, Entitled System and Method for Transmitting Signals to an Applicance, Inventors: Tylicki et al., 9 pages.

(Continued)

*Primary Examiner* — Lee Nguyen (74) *Attorney, Agent, or Firm* — Fitch Even Tabin & Flannery LLP (57) ABSTRACT

A transmitter apparatus is provided that includes an actuator and a transmitter with a housing and wireless transmission circuitry. The actuator is mounted to a structural element of a building and is at least partially exposed and accessible to a user. The housing is arranged and configured to extend at least partially into an opening in the structural element of the building. The transmission circuitry is arranged and configured to receive the actuations from the actuator and responsively transmit radio frequency (RF) signals to a remotely situated appliance via the antenna.

11 Claims, 4 Drawing Sheets

(56) References Cited

OTHER PUBLICATIONS

United States Patent and Trademark Office, Non-Final Office Action mailed Jun. 8, 2012, in related U.S. Appl. No. 12/132,343, filed Jun. 3, 2008, entitled System and Method for Transmitting Signals to an Appliance, Inventors: Tylicki et al., 19 pages.

United States Patent and Trademark Office, Non-Final Office Action mailed Mar. 11, 2011, in related U.S. Appl. No. 12/132,343, filed Jun. 3, 2008, entitled System and Method for Transmitting Signals to an Appliance, Inventors: Tylicki et al., 19 pages.

United States Patent and Trademark Office, Non-Final Office Action mailed Mar. 15, 2011, in related U.S. Appl. No. 12/132,295, filed Jun. 3, 2008, entitled System and Method for Transmitting Signals to an Applicance, Inventors: Tylicki et al., 17 pages.

SYSTEM AND METHOD FOR TRANSMITTING SIGNALS TO AN APPLIANCE

CROSS REFERENCES TO RELATED APPLICATIONS

This application is a continuation of prior application Ser. No. 12/473,972, filed May 28, 2009, which is a continuation of prior application Ser. No. 12/132,343, filed Jun. 3, 2008, and entitled "System and Method for Transmitting Signals to an Appliance," each of which is hereby incorporated herein by reference in its entirety. This application also related to and incorporates by reference related application Ser. No. 12/132,295, filed Jun. 3, 2008, now U.S. Pat. No. 8,055,200.

TECHNICAL FIELD

The field of the invention relates to transmitters and, more specifically, to the actuation of appliances using transmitters.

BACKGROUND

Various types of appliances are utilized in today's homes and businesses. For example, door bells, intercoms, lights, fans, alarm systems, and moveable barrier operators are only a few examples of such appliances in use today. To activate or control the operation of an appliance, some type of actuator is typically used. For instance, a switch may be actuated by a user in order to activate a light, or a doorbell button may be pressed by a user to cause door bell chimes associated with the button to sound. In some examples, the actuator may be hard-wired to the appliance. In other cases, the actuator may be associated with a wireless transmitter. When a wireless actuator is actuated, a radio frequency (RF) signal is formed and then transmitted via an antenna to the appliance. The appliance receives the RF signal and activates the appliance according to the RF signal.

Wireless systems have proved to be convenient for many users, for example, avoiding the need to re-wire existing systems. Unfortunately, wireless systems also have experienced various problems that often limited their use and/or effectiveness. More specifically, wireless systems are often attached to the exterior walls of buildings. The walls themselves are constructed of materials such as stucco (that include a metallic mesh), or are surrounded by steel or aluminum siding all of which interfere with and/or absorb wireless signals intended to be sent from the wireless transmitters to the appliance. Wireless doorbells or chimes are a good example of the later problem. Signals transmitted by wireless door bell buttons (attached to the exterior walls of buildings) often could not be received and/or were interfered with by the constructional composition and/or structure of the walls to which they were attached. Hence, these signals could not be received by the chime unit, or if they were received, were unusable by the chime unit due to degradation in signal quality.

Moreover, with respect to wireless door chimes, transmitters and batteries required for the chimes created a unit with less than idea aesthetics. These items extended out from an outside wall as opposed to be nearly flush or co-planar with the planar surface of an outside wall. The outwardly extended portion of the door bell button unit created a less than desired aesthetic unit when installed.

As a result of the above-mentioned problems, wireless signals sent by wireless actuators which were intended to activate and/or control an appliance often were not received by the appliance. Units also were created with less than desired attractiveness to consumers. These problems have led to user inconvenience and frustration with these previous systems.

SUMMARY

An apparatus, method and system are provided whereby portions of a wireless transmitter are arranged and situated relative to a structural element of a building so as to ensure that the wireless signals transmitted by the transmitter will be received by an appliance and received in a form that is usable by the appliance. Further, the approaches provided herein permit the wireless transmitter to be inserted into a wall such that a button or actuator can be nearly flush or coplanar with the wall. More specifically, an actuator (e.g., a button) is disposed so as to be at least partially accessible by a user. Furthermore, a transmitter comprising a housing, transmission circuitry and an antenna are disposed at least partially into or through an opening in the structural element of the building such that the transmitter is effective for transmitting wireless signals such as RF signals, to the appliance. Consequently, a transmission from a wireless transmitter to an appliance may occur without the interference of the structural element of the building and the signal will be received in a form usable by the appliance. The approaches described herein are easy to use, can be readily retrofitted with existing buildings and appliances, are aesthetically pleasing, and are easy and cost effective to implement.

The apparatus and method described herein include a transmitter apparatus effective for activating a remotely situated appliance. The transmitter apparatus includes a transmitter actuator and a radio frequency (RF) transmitter. The radio frequency (RF) transmitter includes RF transmission circuitry and an antenna. The RF transmitter is configured to be mounted to a structural element of a building and configured to receive an actuation by a user to wirelessly transmit a signal. An antenna is coupled to the RF transmitter circuitry and is arranged and configured to transmit the signal to a remotely situated appliance. The antenna is disposed within an opening in the structural element of the building and is of dimensions so as to extend at least partially through the opening. The antenna transmits the signal to the appliance without significant interference or absorption from the structural element of the building.

In some of these examples, the RF transmitter further includes a power source and the power source is disposed so as to be accessible to the user without removing the RF transmitter from its mounted position.

The antenna can be also structured in any number of ways. For example, the antenna may be a wire or a printed circuit board (PCB) antenna. Other examples of antennas are possible. When a wire is used, the length (or other characteristics) of the wire may be selected so that the wire extends through the opening and, hence, beyond the structural element of the building.

In still others of these examples, the transmitter may include a housing with the antenna being disposed within the housing. In some examples, the housing is generally cylindrical in shape.

Further, the transmitter and transmitter circuitry may be secured to various structural elements of buildings according to the present approaches. For example, the transmitter may be secured to exterior walls, interior walls, or barriers (e.g., doors). Other structural elements may also be used.

The remotely situated appliance may also be a variety of different devices. For example, the remotely situated appliance may be a doorbell, a light; an intercom, a fan, an alarm system, a moveable barrier operator, a window treatment, a rolling shutter, a hot tub, a fireplace, a television, or a video source. Other examples of appliances are possible.

The transmitter may be coupled to a number of different actuators. For example, one or more buttons may be included. In some examples, the one or more buttons are illuminated.

In others of these approaches, a transmitter is mounted to an exterior surface of a building and the transmitter including the transmission circuitry and the antenna. An opening is formed in the building and the opening extends at least partially through a structural element of the building. The antenna is disposed within the opening. The transmitter may be actuated and responsively transmit a radio frequency (RF) signal to the remotely situated appliance via the antenna. The signal being transmitted to the appliance is received at the appliance without significant interference or absorption from the structural element of the building.

The opening may be formed according to a variety of different approaches. For example, the opening may be a variety of dimensions, shapes, and sizes, in one example passing completely through a wall of the building. In other examples, the opening may only pass partially through the wall. In still other examples, the opening is a preexisting opening in the wall and no new opening need be created.

In some examples, the opening extends completely through the structural element of the building and the antenna is disposed so as to completely pass through the opening. In other examples, the hole may extend completely through the structural element, but the antenna may extend only partially through. In still other examples, both the opening and the antenna extend only partially through the structural element of the building.

In another example, the actuator which is reactively coupled to the transmitter is mounted into a structural element of a building and is at least partially exposed and accessible to a user. The housing surrounds the actuator leaving a portion of the actuator exposed to permit actuation of the transmitter by a button or the like. The housing is arranged and configured to extend at least partially into an opening in the structural element of the building to permit the transmission of wireless signals to the appliance. Transmission circuitry and an antenna are in the housing downstream the actuator. The transmission circuitry is arranged and configured to receive the actuations from the actuator and responsively transmit radio frequency (RF) signals to a remotely situated appliance via the antenna.

In many examples, the transmitter includes a power source such as a battery. The power source may be disposed within the transmitter so as to be accessible to the user without removing the actuator from its mounted position. Alternatively, the power source may be disposed within the transmitter housing so as to be accessible to the user only by removing the actuator from its mounted position.

The antenna may be disposed at various positions within the housing. In one example, the antenna is disposed within the housing so as to extend at least partially beyond the structural element of the building when the housing is inserted into the opening. Other placements of the antenna relative to the opening are possible.

The housing may also be of varying dimensions and shapes, and preferably is rigid to assist in the insertion of the housing and encased transmitter and batteries into a wall or structure. In one example, the housing is cylindrical in shape, for example, a cylindrical tube that is less than approximately 1.5 inches in diameter. In this circumstance, the housing surrounding the transmitter and the antenna can be readily inserted in a hole previously used in a hard wired door bell system. In other examples, the housing may be "D" shaped, "C" shaped, or a cone. The hole may also be of different shapes and dimensions. For example, the hole may be of less than about 1.5 inches in diameter. In some examples, the housing is also is less than approximately 1.5 inches in diameter and the housing diameter is sized to be slightly smaller than the hole diameter to provide a snug fit. Other examples of shapes and dimensions for the housing and hole are possible.

As mentioned, the transmitter may be inserted into various structural elements of buildings. In this regard, the structural element may include openings in exterior walls, interior walls or barriers for receipt of the housing/transmitter. The remotely situated appliance may be a number of different devices such as a door bell, a light, an intercom, a fan, an alarm system, a moveable barrier operator, a window treatment, a rolling shutter, a hot tub, a fireplace, a television, or a video source. Other examples of structural elements and appliances are possible.

The actuator may also assume different forms. In one example, the actuator comprises at least one button. In some examples, the one or more buttons are illuminated.

The proportions of the actuator as compared to the housing may also vary. For example, the actuator will have a first volume and the housing will have a second volume, and the first volume is less than the second volume. In an important aspect, more than 70 percent of the volume of the transmitter is contained in the wall structure.

In others of these approaches, an actuator is mounted to a structural element of a building. A housing of the transmitter is disposed into an opening in a structural element of a building and coupled to the actuator. The housing includes an RF transmission circuitry and an antenna for responsively transmitting radio frequency (RF) signals to a remote appliance upon actuation of the actuator.

In some examples, the housing is disposed in the structural element by drilling a hole completely through a wall of the building. In some examples, the hole is of less than approximately 1.5 inches in diameter.

In other examples, a power source at the transmitter is accessed without removing the actuator from its mounted position. In alternative approaches, the power source at the transmitter is accessed by removing the actuator from its mounted position.

Thus, an apparatus is provided where wireless transmitters can be successfully used to wirelessly activate or otherwise control appliances. The apparatus minimizes or eliminates the impact of the construction, configuration, or other characteristics of building elements or other potential interference sources. The apparatus described herein is easy to install or retrofit into a prior hard wired system and is cost effective to implement and result in the effective operation and/or control of appliances for the user. Consequently, user satisfaction with systems that implement these approaches is significantly enhanced.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DESCRIPTION

Figure 1:
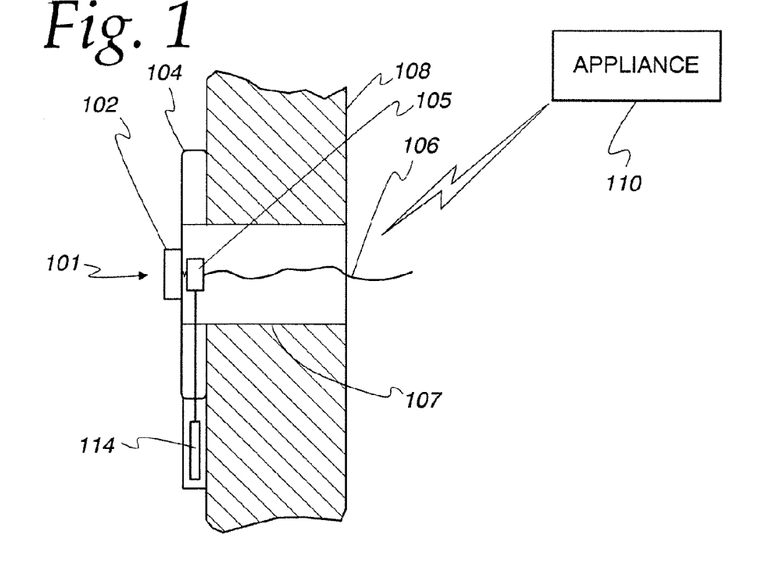
FIG. 1 comprises a side view of a wireless transmission system according to an embodiment the present invention.

Referring now to FIG. 1, one example of a wireless transmission system is described. A transmitter 104 is reactively coupled to an actuator 102 to provide a transmitter apparatus 101. In this example, the actuator 102 is a button. In other examples, the actuator 102 may be a switch, keypad, or rotating wheel. Other examples of actuators are possible. In addition, there may also be more than one actuator 102 (e.g., multiple buttons). In other examples, the actuator 102 may be illuminated by a light or other arrangement disposed within the actuator 102 or the transmitter 104. A decorative plate (not shown) may also surround the actuator 102.

An antenna 106 is coupled to the rear of the transmitter 104. Radio frequency (RF) signals are transmitted from the antenna to an appliance 110. The signals are received by the appliance 110 and may activate and/or otherwise control the operation of the appliance 110.

The antenna 106 may be any antenna structure capable of transmitting radio frequency (RF) signals. In one example, the antenna is a stiff or semi-stiff wire. In other examples, the antenna may be a printed circuit board (PCB) antenna. Other examples of antenna structures are possible.

The appliance 110 may be any of a variety of types of devices. For example, the appliance may be a doorbell (or chime), a light, an intercom, a fan, an alarm system, a moveable barrier operator, a window treatment, a rolling shutter, a hot tub, a fireplace, a television, or a video source. Other examples of appliances are possible. The appliance 110 is remotely situated from the actuator 102, transmitter 104, and antenna 106. That is, the appliance 110 is not coextensive with these elements and is within range of signals transmitted from the antenna 106.

As shown, an opening 107 extends completely through a structural element 108 of a building. The structural element 108 may be any structural component of a building such as an external wall, an internal wall, or a barrier (e.g., door, gate, or the like). Other examples of structural elements are possible. The opening 107 may be formed in any number of ways. For example, a standard drill using a standard drill bit may be used to form the opening (e.g., a hole one inch or less in diameter). Other approaches for forming the opening are possible. In some cases, the opening may be an existing opening.

Additionally, the antenna 106 may be enclosed in a housing (not shown in FIG. 1). In some examples, the housing may be cylindrical in shape and sized to fit into the opening 107. For instance, when a housing is used, the housing may fit in the hole created by standard sized drill bits. In some cases, the housing advantageously allows the antenna to be placed into and/or through the opening 107 without snagging the antenna 106.

The transmitter 104 may include circuitry 105 to receive an actuation from the actuator 102 and convert the actuation into a signal for transmission via the antenna 106. The transmitter 104 and transmitter circuitry 105 are secured to the structural element 108 and the antenna 106 is disposed within the opening 107 (e.g., a drilled hole) in the structural element 108 of a building. In so doing, any interference or absorption of RF signals transmitted by the antenna 106 caused by the structural element 108 of the building (or items attached to or associated with the structural element 108) is substantially reduced or eliminated. In other words, this configuration allows a signal of sufficient quality (e.g., having a sufficient power level or other operating characteristics) to be received and recognized by the appliance 110.

The transmitter 104 may further include and is coupled to a power source 114. In some examples, the power source 114 is a battery. The power source 114 is disposed so as to be accessible to the user without removing the transmitter 104 from its mounted position. For example, the power source 114 may be accessed by a removable cover. In other examples, the power source 114 is only accessible by the transmitter from its mounted position. For example, the whole of the transmitter 104 may need to be removed before the power source 114 can be accessed.

Figure 2:
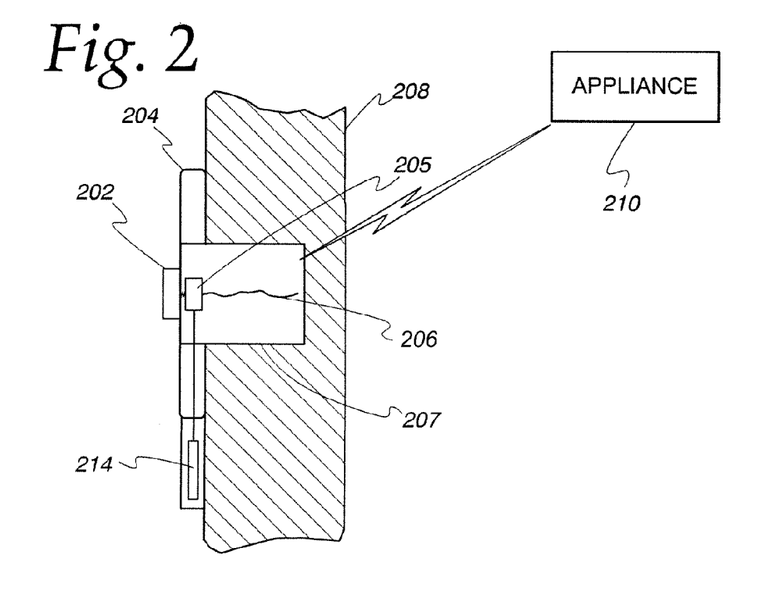
FIG. 2 comprises a side view of a wireless transmission system according to an embodiment of the present invention.

Referring now to FIG. 2, another example of a wireless transmission system is described. A transmitter 204 including circuitry 205 and antenna 206 are coupled to actuator 202. In this example, the actuator 202 is a button. In other examples, the actuator 202 may be a switch, keypad, or rotating wheel. Other examples of actuators are possible. In addition, there may also be more than one actuator 202 (e.g., multiple buttons). In other examples, the actuator 202 may be illuminated by a light or other arrangement disposed within the actuator 202 or the transmitter 204. A decorative plate (not shown) may also surround the actuator 202.

An antenna 206 is coupled to the rear of the transmitter circuitry 205. Signals are transmitted from the antenna to an appliance 210. Radio frequency (RF) signals are received by the appliance 210 and may activate and/or otherwise control the operation of the appliance 210.

The antenna 206 may be any antenna structure capable of transmitting radio frequency (RF) signals. In one example, the antenna is a stiff or semi-stiff wire. In other examples, the antenna may be a printed circuit board (PCB) antenna. Other examples of antenna structures are possible.

The appliance 210 may be a variety of type of devices. For example, the appliance may be a doorbell (or chime), an intercom, a light, a fan, an alarm system, a moveable barrier operator, a window treatment, a rolling shutter, a hot tub, a fireplace, a television, or a video source. Other examples of appliances are possible. The appliance 210 is remotely situated from the actuator 202, transmitter 204, and antenna 206. That is, the appliance 210 is not coextensive with these elements and is within range of signals transmitted from the antenna 206.

As shown, an opening 207 extends partially through a structural element 208 of a building. The structural element 208 may be any structural component of a building such as an external wall, an internal wall, or a barrier (e.g., door, gate, or the like). Other examples of structural elements are possible. The opening 207 may be formed in any number of ways. For example, a standard drill using a standard drill bit may be used to form the opening (e.g., hole one inch or less in diameter). Other approaches for forming the opening are possible. In some cases, the opening may be an existing opening.

Additionally, the antenna 206 may be enclosed in a housing (not shown in FIG. 2). In some examples, the housing may be cylindrical or rectangular, or other shape which is sized to fit into the opening 207. For instance, when a housing is used, the housing may fit in the hole created by standard sized drill bits. In some cases, the housing advantageously allows the antenna to be placed into and/or through the opening 207 without snagging the antenna 206.

The transmitter 204 includes circuitry 205 to receive an actuation from the actuator 202 and convert the actuation into a signal for transmission via the antenna 206. The transmitter 204 is secured to the structural element 208 and the antenna 206 is disposed within the opening 207 (e.g., a drilled hole) in the structural element 208 of a building. In this example, the antenna 206 does not extend completely through the structural element 208. However, in this example this placement is acceptable due to the construction and structure of the structural element 208. For instance, steel or aluminum siding may be present on only one side of the structural element 208 and once the antenna 206 extends beyond this siding, any interference or absorption problems are significantly reduced or eliminated. In other words, a signal of sufficient quality (e.g., having a sufficient power level or other operating characteristics) is received and recognized.

The transmitter 204 is coupled to a power source 214. In some examples, the power source 214 is a battery. The power source 214 is disposed so as to be accessible to the user without removing the transmitter 204 from its mounted position. For example, the power source 214 may be accessed by a removable cover. In other examples, the power source 214 is only accessible by the transmitter from its mounted position. For example, the whole of the transmitter 204 may need to be removed before the power source 214 can be accessed.

Figure 3:
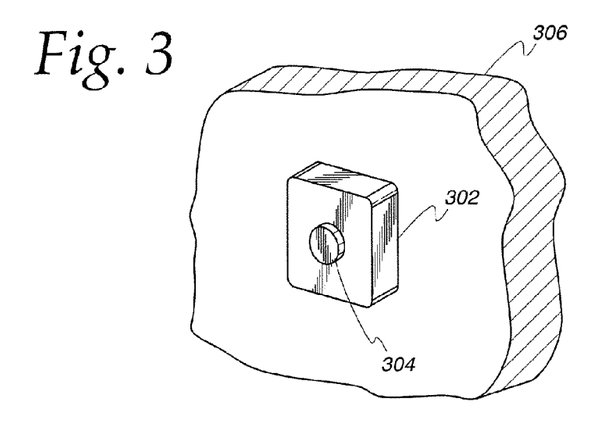
FIG. 3 comprises a perspective view of a wireless transmission system mounted to a structural element of a building according to an embodiment of the present invention.

Referring now to FIG. 3, the placement of a wireless transmission system is described. In this example, the transmitter apparatus which includes transmitter 302 (with an actuator 304) is attached to the surface of a wall 306. An antenna of the transmitter (not shown) extends through a hole in the wall 306 to the other side of the wall 306. In so doing, any interference or absorption of RF signals transmitted by the antenna caused by the wall or items attached to or associated with the wall or structural element (e.g., siding, other electronic devices) is substantially reduced or eliminated.

Figures 4, 5:
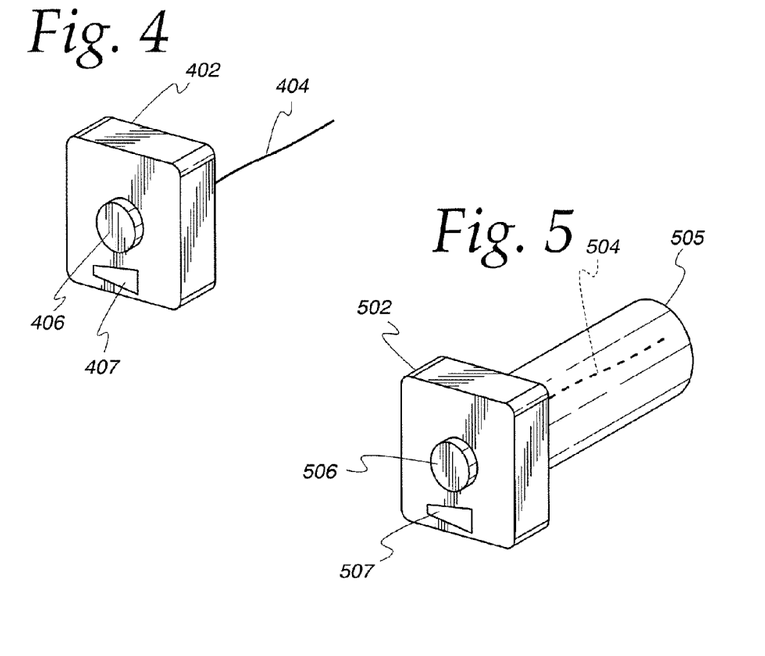
FIG. 4 comprises a perspective view of a wireless transmission system according to an embodiment of the present invention.
FIG. 5 comprises a perspective view of a wireless transmission system according to an embodiment of the present invention.

Referring now to FIG. 4, an example of a wireless transmission system is described. A transmitter 402 includes an actuator 406 and an antenna 404. In this example, the antenna 404 is a wire. The transmitter 402 includes circuitry to receive an actuation from the actuator 406 and convert the actuation into a signal for transmission via the antenna 404. A removable cover 407 is removed to access a power source (e.g., a battery).

The transmitter 402 is secured to a wall and the antenna 404 is disposed within an opening (e.g., a drilled hole) in a structural element (e.g., a wall) of a building. In some examples, the opening extends completely through the structural element and the wire is of suitable length so as to extend completely through and out of the opening. In so doing, any interference or absorption of RF signals transmitted by the antenna 404 caused by the structural element of the building (or items attached to or associated with the structural element) is substantially reduced or eliminated.

Referring now to FIG. 5, another example of a transmission system is described. A transmitter apparatus includes transmitter 502 with its circuitry (not shown), an antenna and an actuator 506. In this example, the antenna 504 is a wire. The antenna 504 is housed in a housing 505. The housing is constructed of a suitable material such as a rigid plastic that does not interfere with or minimally interferes with transmissions made via the antenna 504. A removable cover 507 is removed to access a power source (e.g., a battery). In some examples, the housing 505 is cylindrically shaped and fits within a predrilled hole in the structural element (e.g., wall) of a building. The dimensions of the housing (e.g., its diameter) in some examples are such that it fits within a hole drilled with standard drill bits. In some instances, the housing 505 may advantageously be inserted into the drilled hole without having the antenna 504 snag on or otherwise be encumbered by the sides of the hole.

The transmitter 502 includes circuitry to receive an actuation from the actuator 506 and convert the actuation into a signal for transmission via the antenna 504. The transmitter 502 is secured to a wall and the antenna 504 is disposed within an opening (e.g., a drilled hole) in a structural element (e.g., a wall) of a building. In some examples, the opening extends completely through the structural element and the wire is of suitable length so as to extend completely through and out of the opening. In so doing, any interference or absorption of RF signals transmitted by the antenna 504 caused by the structural element of the building (or items attached to or associated with the structural element) is substantially reduced or eliminated.

Thus, approaches are provided whereby portions of a wireless transmitter are arranged and situated so as to ensure that the wireless signals transmitted by the transmitter will be received by an appliance intended to receive the wireless signals. More specifically, an antenna portion of the transmitter is disposed so as to avoid, reduce, or eliminate the interference of structural elements of buildings. The approaches described herein are easy to use, can be retrofitted with existing buildings and appliances, and are easy and cost effective to implement.

Figure 6:
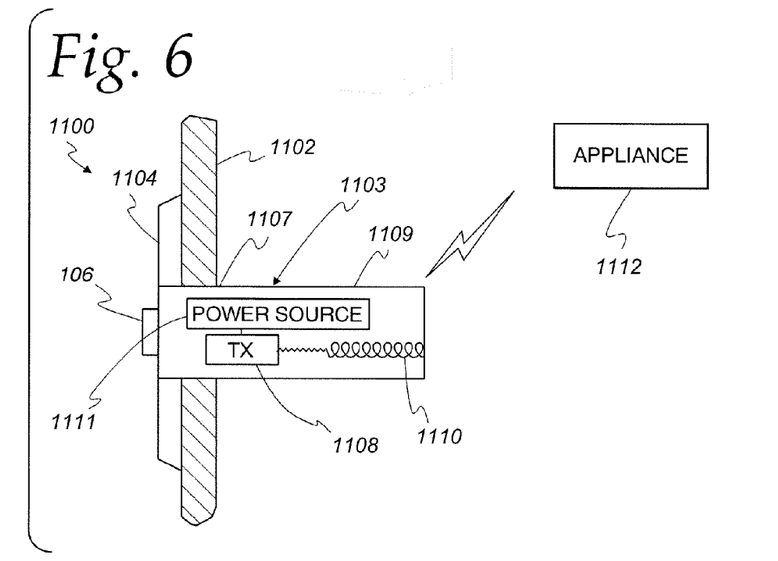
FIG. 6 comprises a side view of a wireless transmitter according to an embodiment the present invention.

Referring now to FIG. 6, another example of a wireless transmitter apparatus 1100 that actuates a remotely situated appliance 1112 is described. The wireless transmitter apparatus includes an actuator 1106, a decorative plate 1104 and transmitter 1103. In this example, the actuator 1106 is a button. In other examples, the actuator 1106 may be a switch, keypad, or rotating wheel. Other examples of actuators are possible. In addition, there may also be more than one actuator 1106 (e.g., multiple buttons). In other examples, the actuator 1106 may be illuminated by a light or other arrangement disposed within the actuator 1106 or the decorative plate 1104. The decorative plate 1104 surrounds the actuator 1106 and may be the existing decorative plate that is mounted to a structural element 1102 of a building.

The transmitter 1103 includes a housing 1109, transmission circuitry 1108 and antenna 1110. The housing extends partially or completely through an opening 1107 in the structural element 1102. The housing 1109 surrounds transmission circuitry 1108, and an antenna 1110 and may include power source 1111. The antenna 1110 is coupled to transmitter circuitry 1108 and may be disposed to the rear of the housing 1109. Radio frequency (RF) signals are transmitted from the antenna 1110 to the appliance 1112. The signals are received by the appliance 1112 and may activate and/or otherwise control the operation of the appliance 1112.

The antenna 1110 may be any antenna structure capable of transmitting radio frequency (RF) signals. In one example, the antenna 1110 is a stiff or semi-stiff wire. In other examples, the antenna 1110 may be a printed circuit board (PCB) antenna. Other examples of antenna structures are possible.

The appliance 1112 may be a variety of type of devices. For example, the appliance may be a door bell (or chimes), a light, an intercom, a fan, an alarm system, a moveable barrier operator, a window treatment, a rolling shutter, a hot tub, a fireplace, a television, or a video source. Other examples of appliances are possible.

The appliance 1112 is remotely situated from the actuator 1106 and the transmitter 1103. That is, the appliance 1112 is not coextensive with these elements and is within range of signals transmitted from the antenna 1110. In one example, the transmitter 1103 is inserted into the exterior wall of a home and the remotely situated appliance 1112 is a chime unit mounted to an interior wall in an adjacent entryway or foyer of the home.

As shown, an opening 1107 extends completely through a structural element 1102 of a building. The structural element 1102 may be any structural component of a building such as an external wall, an internal wall, or a barrier (e.g., door, gate, or the like). Other examples of structural elements are possible. The opening 1107 may be formed in any number of ways. For example, a standard drill using a standard drill bit may be used to form the opening (e.g., a hole 1.5 inches or less in diameter). Other approaches for forming the opening 1107 are possible. In some cases, the opening may be an existing opening.

In the example of FIG. 6, the opening 1107 extends completely through the structural element 1102 and the antenna 1110 is a wire (within the housing 1109) having a length and positioned within the housing 1109 so as to extend completely through and out of the opening 1107. In so doing, any interference or absorption of RF signals transmitted by the antenna 1110 caused by the structural element 1102 of the building (or items attached to or associated with the structural element) is substantially reduced or eliminated.

In other examples, the opening 1107 may extend completely through the structural element 1102, but the housing 1109 may extend only partially through the opening 1107. In still other examples, both the opening 1107 and the housing 1109 extend only partially through the structural element 1102 of the building, but the transmitter and antenna extend through the opening sufficiently far to permit the wireless transmission of signals and successful receipt of such signals by the application to activate the appliance.

With respect to the antenna 1110 and transmission circuitry 1108, in some examples, both the antenna 1110 and the transmission circuitry 1108 are positioned within the housing 1109 to reside completely within the structural element 1102. In other examples, a first part of the transmission circuitry 1108 resides within the structural element 1102 while a second part resides outside structural element 1102, and the antenna 1110 resides within the structural element 1102. As positioned with the housing 1109, the transmission circuitry 1108 and/or antenna 1110 may also extend beyond the structural element 1102.

In many examples, the housing 1109 that encloses the antenna 1110 and the transmission circuitry 1108 is shaped to fit into openings of buildings. In one example, the housing 1109 is rigid, made of materials such as plastic which will not interfere with the transmission of RF signals and is cylindrically shaped so that it can be easily be inserted into standard-sized holes drilled using standard-sized drill bits. In other examples, it may be "D" shaped, "C" shaped, or shaped as a cone. Other examples of shapes are possible.

The drill hole may also be of varying shapes and dimensions. For example, the drill hole may be about 1.5 inches or less and cylindrically shaped. Other examples of shapes and dimensions for the hole are possible. The housing 1109 may be cylindrically shaped, sized and sufficiently rigid to fit and be pushed into and/or through the hole. The hole may also be a preexisting hole or newly drilled.

In some examples, the housing diameter is selected so as to be slightly smaller than the hole diameter to provide a snug fit. In other examples, the dimensions of both hole and housing are selected to provide a looser fit. In still other examples, the housing and sides of the hole are not even in contact with each other. In some examples, the shape of the hole and housing are the same (e.g., both cylindrical). In other examples, the shapes are different (e.g., one square, the other cylindrical).

The transmission circuitry 1108 receives actuations from the actuator 1106 and converts the actuations into signals for transmission via the antenna 1110. The housing 1109 is disposed within the opening 1107 (e.g., a drilled hole) in the structural element 1102 of a building. In so doing, any interference or absorption of RF signals transmitted by the antenna 1110 caused by the structural element 1102 of the building (or items attached to or associated with the structural element 1102) is substantially reduced or eliminated. In other words, this configuration allows a signal of sufficient quality (e.g., having a sufficient power level or other operating characteristics) to be received and recognized by the remotely situated appliance 1112.

In many examples, the transmitter 1103 includes a power source 1111 such as a battery. The power source 1111 may be disposed within the transmitter 1100 so as to be accessible to the user without removing the actuator 1106 from its mounted position. For example, the power source 1111 may be accessed by a removable cover. Alternatively, the power source 1111 may be disposed within the transmitter 1103 so as to be accessible to the user only by removing the actuator 1106 from its mounted position.

Figure 7:
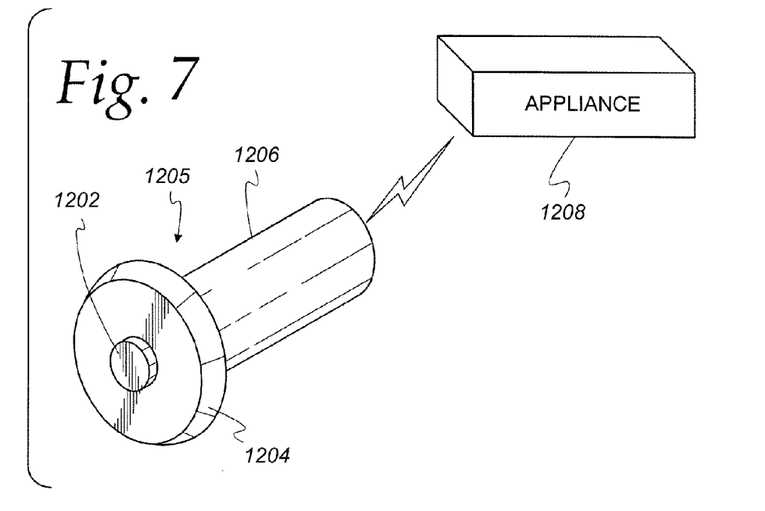
FIG. 7 comprises a perspective view of a wireless transmitter according to an embodiment of the present invention.

FIG. 7 is a perspective view of a wireless transmitter apparatus 1200 used to activate and/or control a remotely situated appliance 1208 is described. The transmitter apparatus 1200 includes an actuator 1202. The actuator 1202 is surrounded by a decorative plate 1204. The decorative plate 1204 may be an existing decorative plate or may be a new decorative plate. Transmitter 1205 also includes a housing 1206. The housing 1206 surrounds an antenna and transmission circuitry (not shown). The actuator 1202 is actuated by a user and, responsively, the transmission circuitry converts the actuation to a signal that is transmitted to the remotely situated appliance 1208 via the antenna.

The antenna resides within the housing and when installed extends within an opening in a structural element of a building. In so doing, any interference or absorption of RF signals transmitted by the antenna caused by the structural element of the building or items attached to or associated with the structural element (e.g., siding, other electronic devices) is substantially reduced or eliminated.

Figure 8:
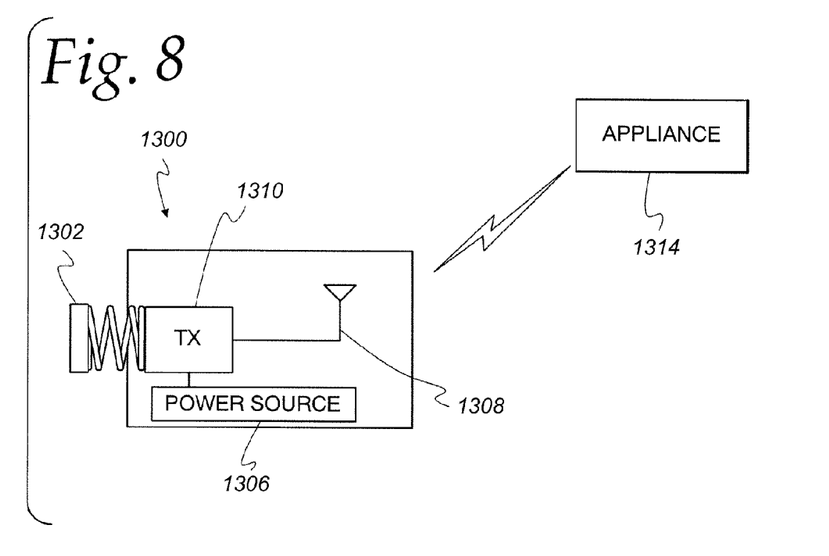
FIG. 8 comprises a schematic diagram of a wireless transmitter according to an embodiment of the present invention.

Referring now to FIG. 8, an example of a wireless transmitter 1300 that is used to activate and/or control a remotely situated appliance 1314 is described. The transmitter apparatus 1300 includes an actuator 1302. The actuator 1302 is coupled to a transmitter which includes transmission circuitry 1310 and antenna 1308. The coupling may be of a wired or wireless connection. The transmission circuitry 1310 is coupled to a power source 1306. For example, the power source may be a battery. The transmission circuitry 1310 also is coupled to an antenna 1308.

In operation, a user actuates the actuator 1302. An indication of the actuation is received at the transmission circuitry 1310. This indication of the actuation is converted by the transmission circuitry 1310 to a radio frequency (RF) signal that is transmitted to an appliance 1314 via the antenna 1310.

The remotely situated appliance 1314 may be a variety of type of devices. For example, the appliance may be a door bell (or chimes), a light, an intercom, a fan, an alarm system, a moveable barrier operator, a window treatment, a rolling shutter, a hot tub, a fireplace, a television, or a video source. Other examples of appliances are possible.

Thus, approaches are provided whereby portions of a wireless transmitter are arranged and situated so as to ensure that the wireless signals transmitted by the transmitter will be received by an appliance intended to receive the wireless signals. The approaches described herein are easy to use, can be retrofitted with existing buildings and appliances, and are easy and cost effective to implement.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention.

What is claimed is:

1. A transmitter apparatus effective for activating a remotely situated appliance, the apparatus comprising:
    a radio frequency (RF) transmitter which includes radio transmission circuitry and an antenna operably coupled to the transmission circuitry;
    a rigid housing comprising a rigid material, the housing configured to hold the transmission circuitry and support the antenna;
    an actuator configured to be operably coupled to the transmitter to effect operation of the transmitter,
    the RF transmitter and the housing configured to be mounted to a mounting surface having an RF interfering material associated therewith, the transmitter configured to receive via the actuator an actuation by a user to effect wireless transmission of a RF signal to a remotely situated appliance, the antenna being disposed at least partially within the rigid housing, which is configured to be disposed within an opening in the mounting surface, the housing and the antenna having dimensions so as to extend at least partially through the opening to extend into the mounting surface sufficiently such that the antenna extends beyond the RF interfering material, the actuator configured to be disposed on a side of the RF interfering material opposite that of at least a portion of the antenna when the transmitter apparatus is mounted on the mounting surface, the antenna transmitting the signal to the appliance to effect control of operation of the appliance without significant interference or absorption from the mounting surface.

2. The transmitter apparatus of claim 1 further comprising a battery mounting device disposed so as to be accessible to the user without removing the RF transmitter from its mounted position.

3. The transmitter apparatus of claim 1 wherein the antenna comprises a wire.

4. The transmitter apparatus of claim 3 wherein the wire is of a length so as to extend through the opening and beyond the RF interfering material associated with the mounting surface.

5. The transmitter apparatus of claim 1 wherein the rigid housing is generally cylindrical in shape.

6. The transmitter apparatus of claim 1 wherein the mounting surface comprises a surface selected from the group consisting of an exterior wall, an interior wall, and a barrier.

7. The transmitter apparatus of claim 1 wherein the remotely situated appliance comprises at least one device selected from the group consisting of a doorbell; an intercom; a light; a fan; an alarm system; a moveable barrier operator; a window treatment; a rolling shutter; a hot tub; a fireplace; a television; and a video source.

8. The transmitter apparatus of claim 1 wherein the actuator is configured to be illuminated.

9. A transmitter apparatus effective for activating a remotely situated appliance, the apparatus comprising:
    an actuator configured to be mounted on a side of a mounting surface of a building;
    a radio frequency (RF) transmitter apparatus configured to be electrically connected to the actuator, mounted to the mounting surface of the building, and to wirelessly transmit a RF signal in response to an actuation by a user on the actuator, the RF transmitter apparatus comprising:
    a housing comprising a rigid material configured to be mounted on the mounting surface of the building;
    RF transmission circuitry within the housing; and
    an antenna electrically coupled to the RF transmission circuitry and disposed at least partially in the housing,
    wherein the housing is configured to structurally support at least a portion of the antenna generally orthogonal to the mounting surface,
    wherein the antenna is configured so as to extend through the housing and an opening in the mounting surface of the building to a side of the mounting surface opposite the actuator to transmit the RF signal to a remote appliance to effect control of the operation of the remote appliance without significant interference or absorption from the mounting surface of the building.

10. The transmitter apparatus of claim 9 wherein the antenna comprises a wire.

11. A transmission apparatus comprising:
    an actuator configured to receive a user activation; and
    a radio frequency (RF) transmitter configured to activate a remotely situated appliance in response to the user activation, the RF transmitter mountable to a mounting wall with a metal structure incorporated therein, the RF transmitter having:
    an antenna structurally supported at least partially within a housing, the antenna and the housing configured to be disposed within an opening at least partially through the mounting wall and past the metal structure of the mounting wall relative to the actuator; and
    transmission circuitry configured to electrically connect to the actuator, a power source, and the antenna, wherein the actuator is disposed on a side of the metal structure opposite that of at least a portion of the antenna when the transmission apparatus is mounted on the mounting wall.

* * * * *